(12) United States Patent
Kubo et al.

(10) Patent No.: US 9,667,113 B2
(45) Date of Patent: May 30, 2017

(54) ROTOR FOR ROTATING ELECTRICAL DEVICE

(71) Applicants: Kaoru Kubo, Miyoshi (JP); Ryoji Mizutani, Nagoya (JP); Hiroki Kato, Toyota (JP); Eiji Yamada, Owariasahi (JP); Shintaro Chinen, Toyota (JP); Kenji Hiramoto, Owariasahi (JP); Hideo Nakai, Nisshin (JP)

(72) Inventors: Kaoru Kubo, Miyoshi (JP); Ryoji Mizutani, Nagoya (JP); Hiroki Kato, Toyota (JP); Eiji Yamada, Owariasahi (JP); Shintaro Chinen, Toyota (JP); Kenji Hiramoto, Owariasahi (JP); Hideo Nakai, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 256 days.

(21) Appl. No.: 14/405,907

(22) PCT Filed: Aug. 23, 2013

(86) PCT No.: PCT/IB2013/001821
§ 371 (c)(1),
(2) Date: Dec. 5, 2014

(87) PCT Pub. No.: WO2014/037776
PCT Pub. Date: Mar. 13, 2014

(65) Prior Publication Data
US 2015/0155753 A1  Jun. 4, 2015

(30) Foreign Application Priority Data

Sep. 6, 2012 (JP) ................................ 2012-196513

(51) Int. Cl.
*H02K 3/48* (2006.01)
*H02K 3/487* (2006.01)
(Continued)

(52) U.S. Cl.
CPC ............. *H02K 3/487* (2013.01); *H02K 1/246* (2013.01); *H02K 3/20* (2013.01); *H02K 3/527* (2013.01)

(58) Field of Classification Search
CPC ............................... H02K 3/487; H02K 3/493
(Continued)

(56) References Cited

U.S. PATENT DOCUMENTS 434,206 A * 8/1890 Schmid .................. H02K 21/10
310/194
4,040,971 A * 8/1977 Simmonds ......... H02K 15/0018
252/62.54
(Continued)

FOREIGN PATENT DOCUMENTS

JP  S61-174854 U  10/1986
JP  H05-22885 A   1/1993
(Continued)

OTHER PUBLICATIONS

Oct. 8, 2014 Japanese Office Action issued in Application No. 2012-196513.

*Primary Examiner* — Hanh Nguyen
(74) *Attorney, Agent, or Firm* — Oliff PLC

(57) ABSTRACT

A rotor for a rotating electrical device includes: a rotor coil that is wound on each of the rotor salient poles; a retaining member that is supported by a rotor core; and an outer magnetic member. The retaining member has a beam bridged between the adjacent rotor salient poles and prevents the rotor coil from falling out. The outer magnetic member is provided in an end of the beam.

8 Claims, 11 Drawing Sheets

(51) Int. Cl.
*H02K 3/52* (2006.01)
*H02K 1/24* (2006.01)
*H02K 3/20* (2006.01)

(58) Field of Classification Search
USPC ..................................... 310/214, 261.1, 262
See application file for complete search history.

(56) References Cited

U.S. PATENT DOCUMENTS

| | | | | |
|---|---|---|---|---|
| 5,252,877 | A * | 10/1993 | Sawa | H02K 3/493 |
| | | | | 310/214 |
| 5,973,432 | A * | 10/1999 | Katagiri | H02K 1/24 |
| | | | | 29/596 |
| 8,232,702 | B2 * | 7/2012 | Zywot | H02K 3/527 |
| | | | | 310/214 |
| 2002/0074889 | A1 * | 6/2002 | Kikuchi | H02K 1/185 |
| | | | | 310/214 |
| 2008/0079375 | A1 | 4/2008 | Seguchi | |
| 2009/0127942 | A1 * | 5/2009 | Rahman | H02K 1/148 |
| | | | | 310/44 |
| 2010/0259136 | A1 | 10/2010 | Hiramoto et al. | |
| 2012/0025662 | A1 | 2/2012 | Takahashi et al. | |

FOREIGN PATENT DOCUMENTS

| | | |
|---|---|---|
| JP | 2008-178211 A | 7/2008 |
| JP | 2009-112091 A | 5/2009 |
| JP | 2013-165592 A | 8/2013 |

* cited by examiner

FIG. 7
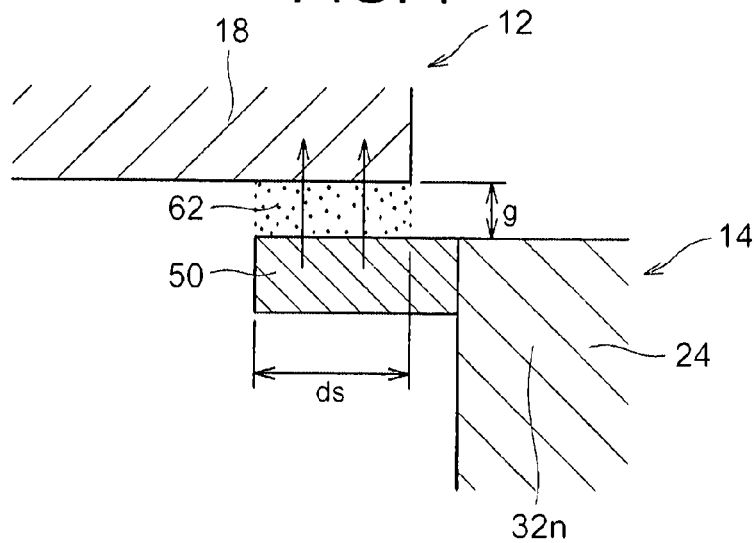
FIG. 8 COMPARATIVE EXAMPLE
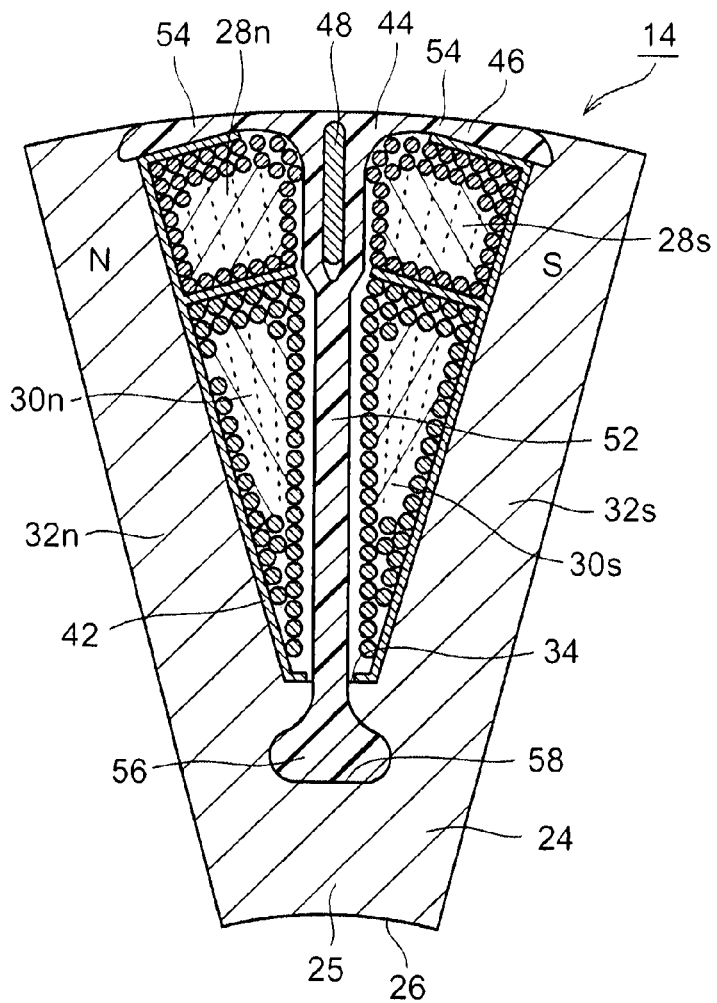

ROTOR FOR ROTATING ELECTRICAL DEVICE

BACKGROUND OF THE INVENTION

1. Field of the Invention

The present invention relates to a rotor for a rotating electrical device and more particularly to a rotor in which a rotor coil is wound and disposed for a rotating electrical device.

2. Description of Related Art

Some rotating electrical devices have a rotor structure in which the rotor coil is wound and disposed in the rotor. For example, Japanese Patent Application Publication No. 2009-112091 (JP 2009-112091 A) discloses a structure of a rotating electrical device in which multiphase alternating current is applied to multiphase stator coils to generate a rotating magnetic field on a stator, and a space harmonic component of the rotating magnetic field is interlinked with rotor coils to generate induced current on a rotor coil. In JP 2009-112091 A, the rotor coils are respectively wound on rotor salient poles of the rotor, and diodes establish short circuits in the respective rotor coils to rectify the induced current. Thus, each rotor salient pole is magnetized with desired polarity, and desired magnetic pole of the rotor can be achieved. In this way, north poles and south poles are alternately formed on the rotor salient poles. Accordingly, the rotor salient poles interact with the rotating magnetic field on the stator, and torque acts on the rotor.

It is desired in the rotor for the rotating electrical device disclosed in the aforementioned JP 2009-112091 A that the rotor coils wound on the rotor salient poles be prevented from falling out due to centrifugal force, while the loss in a case where magnetic flux saturation does not occur in the rotor salient pole is reduced during low-load conditions. It is also desired that ease of assembly of the rotor coil be improved.

SUMMARY OF THE INVENTION

One aspect of the present invention relates to a rotor for a rotating electrical device including: a rotor core that includes rotor salient poles provided at plural positions in a circumferential direction of the rotor core; a rotor coil that is wound on each of the rotor salient poles; a retaining member that is made of a non-magnetic material, the retaining member being supported by the rotor core, having a beam bridged between the adjacent rotor salient poles, and preventing the rotor coil from falling out a slot; and an outer magnetic member that is provided in proximity of an end of the beam in the circumferential direction.

The outer magnetic member may be integrally embedded in the beam.

The outer magnetic member may be provided in an inside or an outside of the beam in a radial direction of the rotor.

The rotor for a rotating electrical device may include a member that is fixed in the rotor core. The outer magnetic member may be provided so as to face an inner surface of the beam in the radial direction of the rotor and interposed between the rotor salient poles and the fixed member in the circumferential direction.

The retaining member may have an engagement groove that is formed in an end of the retaining member in the radial direction of the rotor so as to be recessed in the circumferential direction, and the rotor salient poles may have a first engagement recess that is formed in a side face of the rotor salient poles. The outer magnetic member may be engaged with the engagement groove and the first engagement recess in a state of being interposed between the engagement groove and the first engagement recess in the circumferential direction.

The retaining member may have a T-shaped cross-section.

The end of the beam may be engaged with a second engagement recess that is provided in a side face of the rotor salient poles.

According to the rotor for the rotating electrical device of the present invention, the retaining member can prevent the rotor coil from falling out. In addition, the outer magnetic member is provided in the proximity of the end of the beam, and thus the outer magnetic member may face the magnetic pole of the stator even in a case where the rotor salient pole does not directly face the magnetic pole of the stator. Therefore, the magnetic reluctance in a gap section between the rotor and the stator can be reduced, and the loss in a case where the magnetic flux saturation does not occur in the rotor salient poles can be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a diagram corresponding to a section B in FIG. 6 for illustrating an effect of a facing area in relation to a stator salient pole and a rotor salient pole on magnetic reluctance of a gap section;

FIG. 8 is a diagram corresponding to FIG. 2 and shows a comparative example;

DETAILED DESCRIPTION OF EMBODIMENTS

Embodiments of the present invention will be described hereinafter with reference to the accompanying drawings. In the following description, four types of rotor coils are provided in slots of the rotor core; however, it is merely one example of the present invention. The number of types of the rotor coils provided in the slots may be any number other than four. For example, two types of the rotor coils may be provided in the slots. As an example of the rotor coils provided in the slots, the following description is made for four types of coils that include induction coils which are provided at the north pole and the south pole and utilize the space harmonic component of the rotating magnetic field formed with the stator and common coils which are provided at the north pole and the south pole and utilize the space harmonic component of the rotating magnetic field formed with the stator. However, two types of coils in total which include one induction coil having one of the north pole and the south pole and one common coil having the other of the north pole and the south pole may be provided in the slots.

First Embodiment

Figure 1:
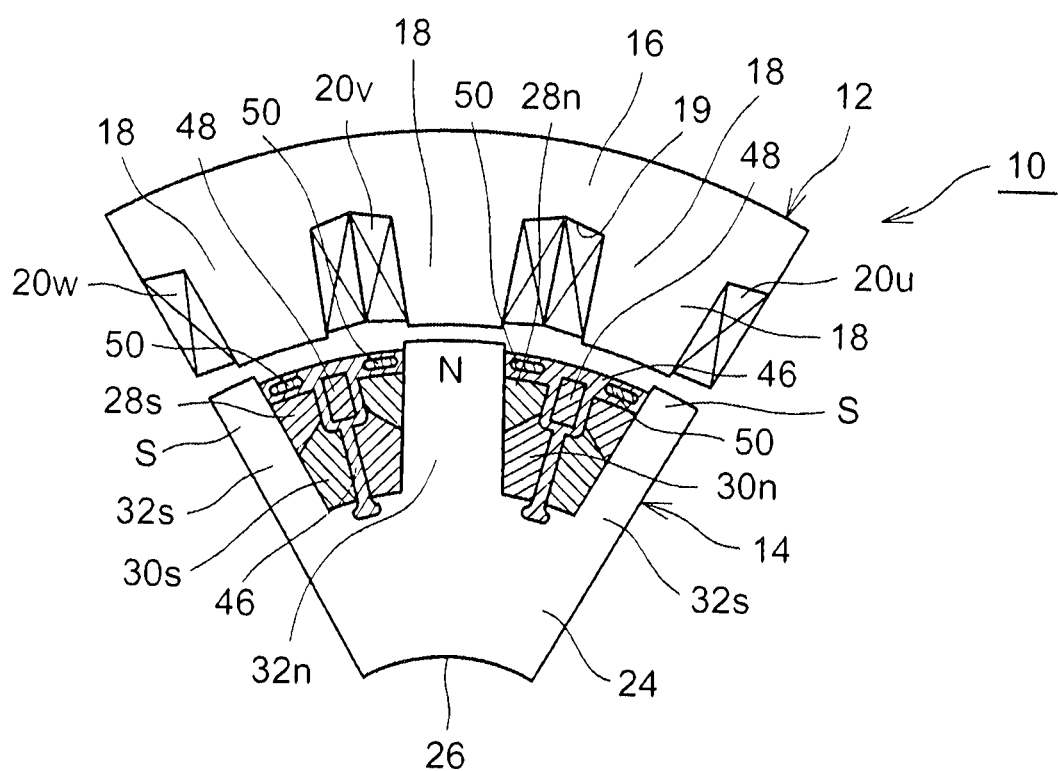
FIG. 1 is a schematic cross-sectional view that shows a part of a rotating electrical device including a rotor according to a first embodiment of the present invention.

FIG. 1 through FIG. 6 show a first embodiment of the present invention. FIG. 1 is a schematic cross-sectional view that shows a part of a stator 12 and a rotor 14 of a rotating electrical device 10 according to the embodiment of the present invention. The rotating electrical device 10 functions as a motor or a generator and includes the stator 12 that is fixed to a casing (not shown) and the rotor 14 that rotatable with respect to the stator 12 and is placed on the inside of the rotor 14 in a radial direction so as to face the stator 12. Here, the term "radial direction" refers to a radial direction that is orthogonal to a rotational axis of the rotor 14. The term "circumferential direction" refers to a circumferential direction of the rotor that is centered on the rotational axis of the rotor 14. Furthermore, the term "axial direction" refers to an axial direction of the rotor 14.

The stator 12 includes a stator core 16 and multiphase (e.g., three phases of U-phase, V-phase, and W-phase) stator coils 20u, 20v, and 20w. The stator core 16 is formed of magnetic member such as laminates of a metal plate e.g., a silicon steel plate. The stator core 16 includes plural salient poles 18 that are provided at plural positions at equal intervals in the circumferential direction to inwardly protrude toward the rotor 14 in the radial direction and slots 19 that are formed between the respective salient poles 18. The stator core 16 may be formed in separate cores or a powder compacting core of magnetic powder.

The stator coils 20u, 20v, and 20w are wound on the salient poles 18 of the stator core 16 through the slots 19 in concentrated windings. For example, applying three-phase alternating current to the multiphase stator coils 20u, 20v, and 20w may cause the respective salient poles 18 to become magnetized and a rotating magnetic field to be generated on the stator 12.

The stator coils 20u, 20v, and 20w are not limited to the structure in which the stator coils are wound on the salient poles 18 of the stator 12. However, the stator coils may be formed with toroidal windings in which multiphase stator coils are wound at plural positions of annular sections of the stator core 16 in the circumferential direction, and therefore the rotating magnetic field may be generated on the stator 12.

The rotor 14 includes a generally cylindrical rotor core 24, four types of rotor coils 28n, 28s, 30n, and 30s that are wound on the rotor core 24, and a retaining member 46 that is supported within a slot 34 (FIG. 2) of the rotor 14. The rotor core 24 is formed such that a shaft bore 26 passes through the center of the rotor core 24 in the axial direction.

A shaft (not shown) of the rotating electrical device is inserted into and fixed in the shaft bore 26. The shaft that is fixed in the way described above is rotatably supported by a bearing member of the casing. Accordingly, the rotor 14 is provided in a rotatable manner with respect to the stator 12.

The rotor core 24 is formed of magnetic members such as laminates of plural magnetic steel plates in one unit. The rotor core 24 may be formed in a powder compacting core of magnetic powder.

Figure 2:
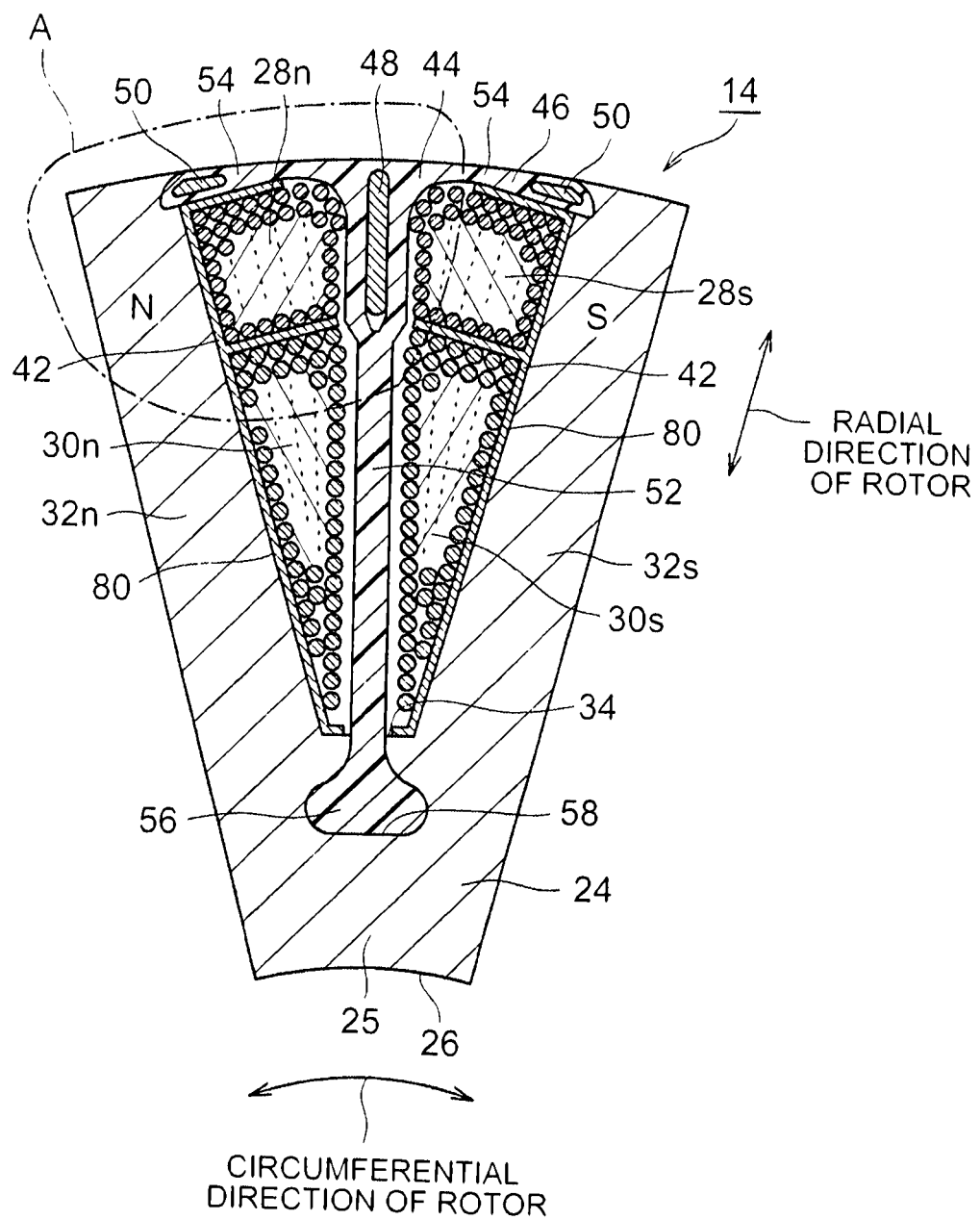
FIG. 2 is an enlarged view of a part of the rotor in FIG. 1.
Figure 3:
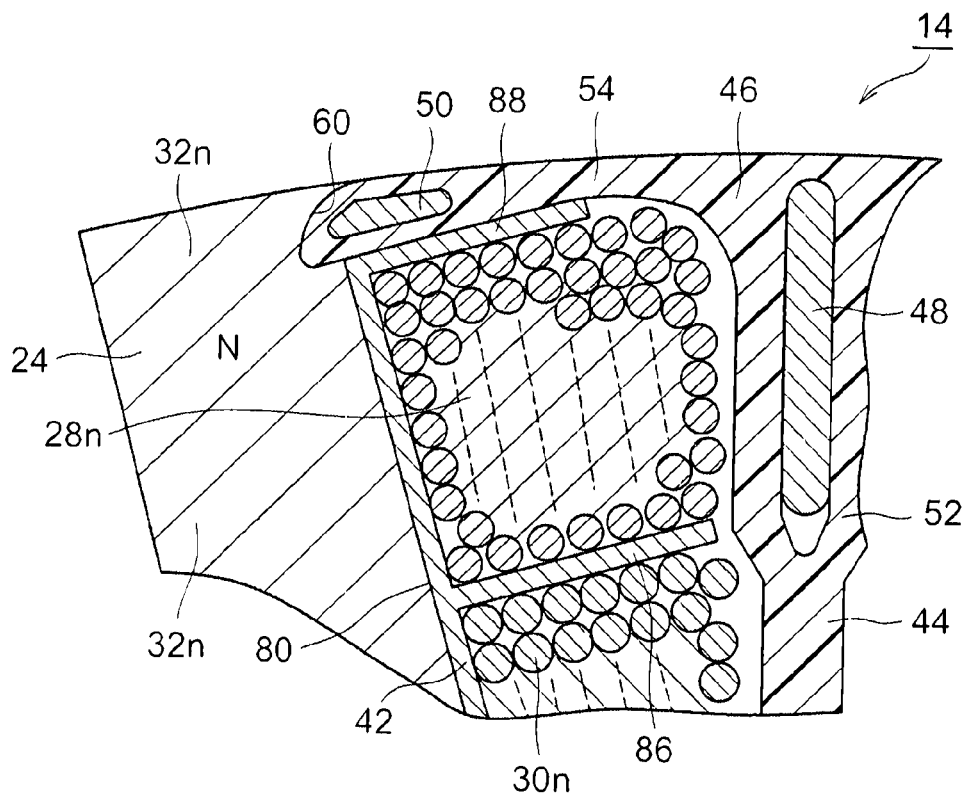
FIG. 3 is an enlarged view of a section A in FIG. 2.

FIG. 2 is an enlarged view of a part of the rotor 14 that is shown in FIG. 1. FIG. 3 is an enlarged view of a section A in FIG. 2. The rotor core 24 includes a cylindrical rotor yoke 25 and rotor salient poles 32n and 32s that are provided at plural positions on an outer peripheral side of the rotor yoke 25 at equal intervals in the circumferential direction. The rotor salient pole 32n is a salient north pole that is magnetized in the north pole by the rotor coils 28n and 30n as described below. In addition, the rotor salient pole 32s is a salient south pole that is magnetized in the south pole by the rotor coils 28s and 30s as described below. The rotor salient pole 32n and the rotor salient pole 32s are alternately provided in the circumferential direction.

The rotor coil 28n is a north pole induction coil that is wound on an outward distal side of the rotor salient pole 32n in the radial direction in concentrated windings. The rotor coil 28s is a south pole induction coil that is wound on the rotor salient pole 32s in a similar manner to the rotor coil 28n. The rotor coil 30n is a north pole common coil that is wound on an inward base side of the rotor salient pole 32n in the radial direction in concentrated windings. The rotor coil 30s is a south pole common coil that is wound on the rotor salient pole 32s in a similar manner to the rotor coil 30n. The rotor coils 28n, 28s, 30n, and 30s are connected to each other through diodes as rectifier parts described below.

The rotor coils 28n, 28s, 30n, and 30s are wound by way of "regular winding" around the rotor salient poles 32n and 32s while aligning in multiple rows of multiple layers. The respective coils 28n, 28s, 30n, and 30s may be formed as simple solenoid coils.

In addition, insulators 42 described below are interposed between the rotor salient pole 32n and the rotor coils 28n and 30n and between the rotor salient pole 32s and the rotor coils 28s and 30s.

The retaining member 46 is provided in the slot 34 of the rotor 14 and has an approximately T-shaped cross-section. The length of the retaining member 46 is approximately equal to or slightly shorter than the overall length of the rotor core 24 in the axial direction. The retaining member 46 includes a body part 44 that is made of a non-magnetic member such as resin, a center magnetic member 48 and a pair of outer magnetic members 50 that are secured within the body part 44.

The length of the body part 44 is approximately equal to or slightly shorter than the overall length of the rotor core 24 in the axial direction. The body part 44 includes a plate-shaped leg 52 and thin plate-shaped beams 54 that are formed into one unit so as to extend from a radial outer end of the leg 52 to circumferential sides and have a circular cross-section.

An inner end 56 of the leg 52 in the retaining member 46 is fixed in an outer periphery of the rotor yoke 25 which is the bottom of the slot in the rotor core 24. More specifically, the end 56 of the leg 52 is formed to swell larger than the part of the leg 52 and engaged in an engagement groove 58 in the rotor yoke 25 which has a shape conforming to the shape of the leg 56. The engagement groove 58 opens into end faces of the rotor core 24 in the axial direction.

As shown in FIG. 3, an engagement recess 60 is formed in a side face of a distal end of the rotor salient pole 32n to extend in the axial direction, and a distal end of the beam 54 of the retaining member 46 engages in the engagement recess 60. Accordingly, ends of the beams 54 are connected and engaged between the adjacent rotor salient poles 32n and 32s.

The center magnetic member 48 is embedded and secured in an outer periphery section of the leg 52. The center magnetic member 48 is provided between the adjacent rotor coils 28n and 28s that are disposed between the adjacent salient poles 32n and 32s. In addition, the center magnetic member 48 is formed of magnetic members such as a metal plate e.g., a silicon steel plate and formed into a thin plate extending in the axial direction which has an approximately rectangular cross-section extending in a radial direction of the rotor.

The center magnetic member 48 as described above is connected to the rotor core 24 through the body part 44 of a non-magnetic material and thus not magnetically connected to the rotor core 24.

The outer magnetic members 50 is integrally embedded in the distal end of the beam 54 of the retaining member 46. The outer magnetic member 50 is formed of magnetic members such as a metal plate e.g., a silicon steel plate and formed into a thin plate extending in the axial direction which has an approximately rectangular cross-section extending in a circumferential direction of the rotor, for example. Accordingly, the outer magnetic member 50 is provided outside the rotor coils 28n and 28s.

In a state where the retaining member 46 is installed in the rotor core 24, the beams 54 of the retaining member 46 are connected outside the rotor coils 28n and 28s between the rotor salient poles 32n and 32s to prevent the rotor coils 28n and 28s from falling out in the radial direction.

The insulator 42 retains the rotor coils 28n and 30n (or 28s and 30s) in a state where the rotor coils are wound at the outside position. The insulator 42 is made of resin, for example, and has electrical insulation properties. In addition, the insulator 42 includes a tubular part 80 that can nearly firmly fit into the rotor salient poles 32n and 32s. The tubular part 80 includes a middle rib 86 that extends from a middle position of the side face in the radial direction of the rotor into the slot 34 and an outer rib 88 that extends from an outer end in the radial direction of the rotor into the slot 34. The rotor coil 30n (or 30s) is arranged inside the middle rib 86 in the radial direction of the rotor, and the rotor coil 28n (or 28s) is arranged between the middle rib 86 and the outer rib 88.

An assembling method of the retaining member 46 and the respective rotor coils 28n, 28s, 30n, and 30s to the rotor core 24 will be described next. First, the corresponding rotor coils 28n, 28s, 30n, and 30s are densely wound on the outside of two insulators 42 to construct a "cassette coil", and the cassette coil is fitted from the outside of the rotor in the axial direction to the periphery of the rotor salient poles 32n and 32s. Accordingly, the corresponding rotor coils 28n, 28s, 30n, and 30s are wound and disposed on the periphery of the rotor salient poles 32n and 32s.

Next, the retaining member 46 is disposed between the adjacent rotor salient poles 32n and 32s while being slid in the axial direction from one side to the other side of the rotor core 24 in the axial direction. In this case, the end 56 of the leg 52 is engaged in the engagement groove 58 formed in the rotor yoke 25. Furthermore, the distal end of the beam 54 is engaged in the engagement recess 60 formed in the rotor salient pole 32n. Consequently, the end 56 of the leg 52 of the retaining member 46 is fitted and secured into the engagement groove 58, and the distal end of the each beam 54 is engaged in the engagement recess 60. The movement of the retaining member 46 to the outside in the radial direction is restricted as described above, and therefore the retaining member 46 can exert retaining force against the centrifugal force that is applied on the rotor coils 28n, 28s, 30n, and 30s when the rotor 14 rotates.

Figure 4:
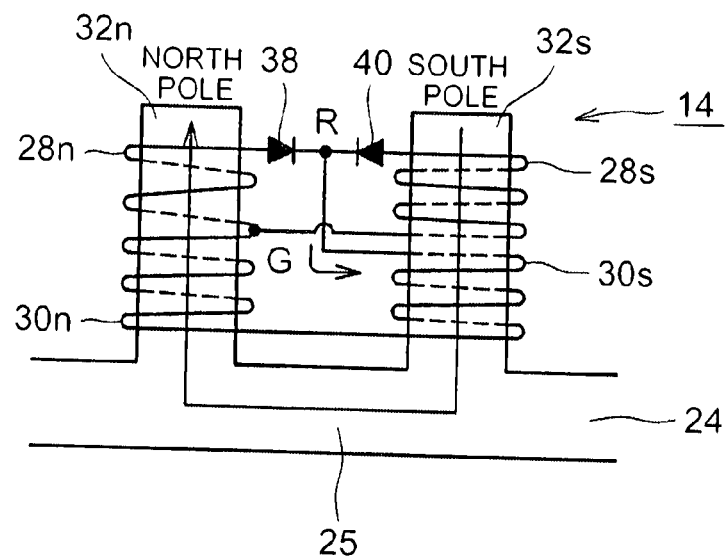
FIG. 4 is a circuit implementation diagram that shows connection for diodes to rotor coils in the rotor of FIG. 1.
Figure 5:
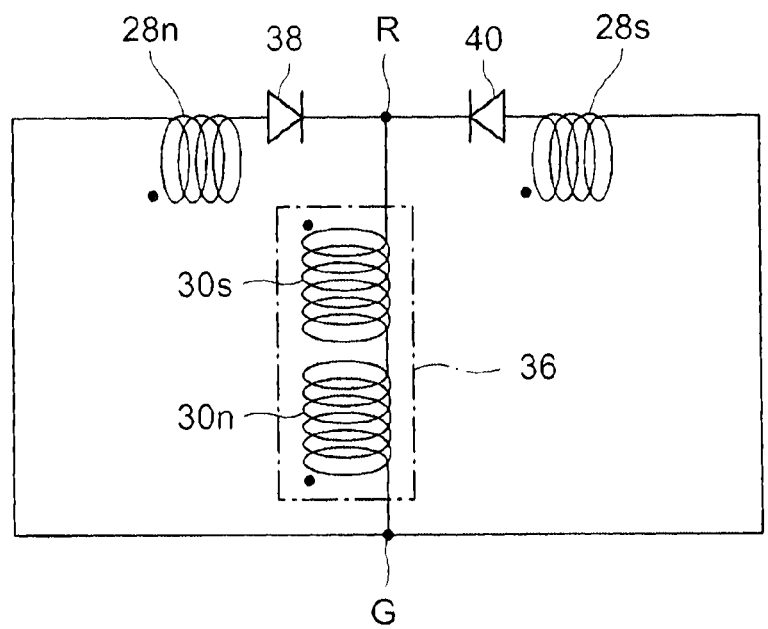
FIG. 5 is a schematic diagram that shows an equivalent circuit of multiple rotor coils wound on two rotor salient poles adjacent to each other in a circumferential direction of the rotor in FIG. 1.

The basic structure of the rotor 14 is as described above; however, the rotor coils 28n, 28s, 30n, and 30s are connected to each other through the diodes, which will be described below with reference to FIG. 4 and FIG. 5. FIG. 4 is a circuit implementation diagram that shows connection for diodes 38 and 40 to the rotor coils 28n, 28s, 30n, and 30s in the rotor 14 according to this embodiment. FIG. 5 is a schematic diagram that shows an equivalent circuit of a connection circuit for multiple rotor coils 28n, 28s, 30n, and 30s wound on two adjacent rotor salient poles in the rotor according to this embodiment.

As shown in FIG. 4 and FIG. 5, two rotor salient poles 32n and 32s adjacent in the circumferential direction of the rotor is determined as one pair. One end of the rotor coil 28n wound on the rotor salient pole 32n is connected to one end of the rotor coil 28s wound on the rotor salient pole 32s through a first diode 38 and a second diode 40 that are the rectifier parts. The first diode 38 is connected to one end of the rotor coil 28n, and the second diode 40 is connected to one end of the rotor coil 28s. The first diode 38 and the second diode 40 of which the forward directions are opposite to each other are connected at a node R.

In each pair, one end of the rotor coil 30n wound on the rotor salient pole 32n is connected to one end of the rotor coil 30s wound on the other rotor salient pole 32n. The rotor coils 30n and 30s are connected to each other in series to form a common coil pair 36. The other end of the rotor coil 30s is connected to the node R, and the other end of the rotor coil 30n is connected to a node G that is an opposite side of the node R for the rotor coils 28n and 28s.

Because of this relation of connection, electric current flows in the order of the rotor coil 28n, the first diode 38, the node R, the rotor coil 30s, the rotor coil 30n, the node G, and the rotor coil 28n as the electric current that passes through the rotor coil 28n. As the electric current that passes through the rotor coil 28s, electric current flows in the order of the rotor coil 28s, the first diode 40, the node R, the rotor coil 30s, the rotor coil 30n, the node G, and the rotor coil 28s.

Accordingly, when the space harmonic component of the rotating magnetic field that is produced by the stator 12 is interlinked with the rotor coils 28n and 28s, the induced current is generated, and one-way current from the rotor coil 28n (or 28s) which is rectified by the diode 38 (or 40) flows through the rotor coils 30n and 30s.

In the structure as described above, when the rectified current flows through the rotor coils 28n, 28s, 30n, and 30s, the respective rotor salient poles 32n and 32s are magnetized and function as magnetic poles. In addition, when the winding direction of the rotor coils 28n, 28s, 30n, and 30s is appropriately set in accordance with a rectifying direction, the north pole and the south pole can alternately be provided to the plural rotor salient poles 32n and 32s in the circumferential direction. That is, the rotor salient pole 32n on which the rotor coils 28n and 30n are wound becomes the north pole, and the rotor salient pole 32s on which the rotor coils 28s and 30s are wound becomes the south pole.

The above description is made for the case where two diodes 38 and 40 are used for two rotor salient poles 32n and 32s. However, only two diodes 38 and 40 can be used in the entire rotor 14. In other words, all rotor coils 28n with the north pole are connected in series and treated as one series-connected induction coil with the north pole, all rotor coils 28s with the south pole are connected in series and treated as one series-connected induction coil with the south pole, all rotor coils 30n with the north pole are connected in series and treated as one series-connected common coil with the north pole, and all rotor coils 30s with the south pole are connected in series and treated as one series-connected common coil with the south pole. Then, the relation of connection shown in FIG. 5 is used, and hence the function of the entire rotor 14 can be satisfied with only two diodes 38 and 40. In this case, the rotor coils 30n and 30s wound on the base side of the adjacent rotor salient poles 32n and 32s may be connected to each other in series without other rotor coils.

Operations and effects of the aforementioned rotor 14 and the rotating electrical device 10 including the rotor 14 will be described next with reference to the accompanying drawings. In the rotating electrical device 10, although applying the alternating current to the stator coils 20u, 20v, and 20w in a specified order causes the stator 12 to generate the rotating magnetic field, the rotating magnetic field includes not only the magnetic field of a fundamental wave component but also the magnetic field of a harmonic component of a higher order than the fundamental wave.

More specifically, the distribution of magnetomotive forces that cause the stator 12 to generate the rotating magnetic field does not become sinusoidal distribution only with the fundamental wave but becomes the sinusoidal distribution including the harmonic component, due to the arrangement of the stator coils 20u, 20v, and 20w with the respective phases and the shape of the stator core 16 with the salient pole 18 and the slot 19. Particularly, in the concentrated windings, the stator coils 20u, 20v, and 20w with the respective phases do not overlap with each other, and therefore the amplitude level of the harmonic component produced in the distribution of magnetomotive forces of the stator 12 increases. For example, in a case where the stator coils 20u, 20v, and 20w are of three-phase concentrated windings, the amplitude level that is a temporal third-order component and a spatial second-order component of input electrical frequency increases as the harmonic component. As described above, the harmonic component produced in the magnetomotive forces due to the arrangement of the stator coils 20u, 20v, and 20w and the shape of the stator core 16 is referred to as the space harmonic.

When the rotating magnetic field including the space harmonic is acted from the stator 12 to the rotor 14, the fluctuation of flux leakage to the space between the rotor salient poles 32n and 32s of the rotor 14 occurs due to flux fluctuation of the space harmonic. Consequently, induced electromotive force is generated in at least one of the rotor coils 28n and 28s shown in FIG. 4. The rotor coils 28n and 28s that are placed near the stator 12 on the distal sides of the rotor salient poles 32n and 32s have the function in which magnetic flux of the rotating magnetic field generate the induced current by interlinking mainly a rotating magnetic field from the stator 12. In addition, the rotor coils 30n and 30s that are placed far from the stator 12 have the function as an electromagnet that magnetizes the rotor salient poles 32n and 32s mainly. As described above, the rotor 14 has alternate north pole and south pole formed in the circumferential direction because the harmonic component included in the magnetic field generated in the stator is interlinked with the rotor 14. In this case, the first diode 38 and the second diode 40 are connected to two adjacent rotor coils 28n and 28s in the multiple rotor coils 28n and 28s. The directions of magnetomotive forces generated in the salient poles 32n and 32s by the induced current flowing through the rotor coils 28n and 28s are oriented in alternate circumferential directions of the rotor at the rotor salient poles 32n and 32s provided in the circumferential direction.

In such a rotating electrical device 10 (FIG. 1), applying three-phase alternating current to three-phase stator coils 20u, 20v, and 20w causes the fundamental wave component of the rotating magnetic field produced in the salient poles 18 (FIG. 1) to be acted on the rotor 14. Accordingly, the salient poles 32n and 32s are attracted to the rotating magnetic field of the salient poles 18 so as to reduce the magnetic reluctance of the rotor 14. Thus, reluctance torque is exerted on the rotor 14.

When the rotating magnetic field including the space harmonic produced in the salient pole 18 is interlinked with the respective rotor coils 28n and 28s of the rotor 14, the induced electromotive force is generated in the rotor coils 28n and 28s through the flux fluctuation with the frequency different from the rotational frequency of the rotor 14 due to the space harmonic. Due to the generation of the induced electromotive force, the electric current flowing through the respective rotor coils 28n and 28s is rectified by the respective diodes 38 and 40 and directed in one direction. The rotor salient poles 32n and 32s are magnetized when the electric current rectified by the diodes 38 and 40 flows through the rotor coils 28n and 28s and the rotor coils 30n and 30s. Therefore, each of the rotor salient poles 32n and 32s is magnetized in either of the north pole or the south pole, and the desired magnetic pole of the rotor can be achieved.

Due to the interaction between the magnetic field of the magnetic pole of the rotor which is produced as described above and the fundamental wave component of the rotating magnetic field produced in the stator 12, the rotor 14 rotates, and the torque is produced on the rotor 14. The aforementioned torque is a different torque from the reluctance torque and corresponds to one type of magnet torque. Accordingly, the space harmonic component of the rotating magnetic field can be effectively used to increase the torque of the rotating electrical device 10.

Furthermore, according to the rotor 14 and the rotating electrical device 10 described above, because the retaining member 46 prevents the rotor coils 28n and 28s from falling out to the outside in the radial direction, the retaining member 46 can securely prevent the rotor coils 28n and 28s and the rotor coils 30n and 30s that are placed on the inner side of the rotor coils 28n and 28s in the radial direction from falling out.

Even when the rotor salient poles 32n and 32s do not directly face in the radial direction of the rotor to the salient pole 18 that is a magnetic pole of the stator 12, the retaining member 46 is provided with the outer magnetic member 50 in the distal end of the beam 54 which is a circumferential end facing the rotor salient poles 32n and 32s, and there is a case where the outer magnetic member 50 faces the salient pole 18 in the radial direction of the rotor through an outside section of the retaining member 46. Therefore, the outer magnetic member 50 can reduce the magnetic reluctance in a gap section between the rotor 14 and the stator 12, and the loss of the rotating electrical device 10 can be reduced in a case where the magnetic flux saturation does not occur in the rotor salient poles 32n and 32s during low-load conditions and so on.

Figure 6:
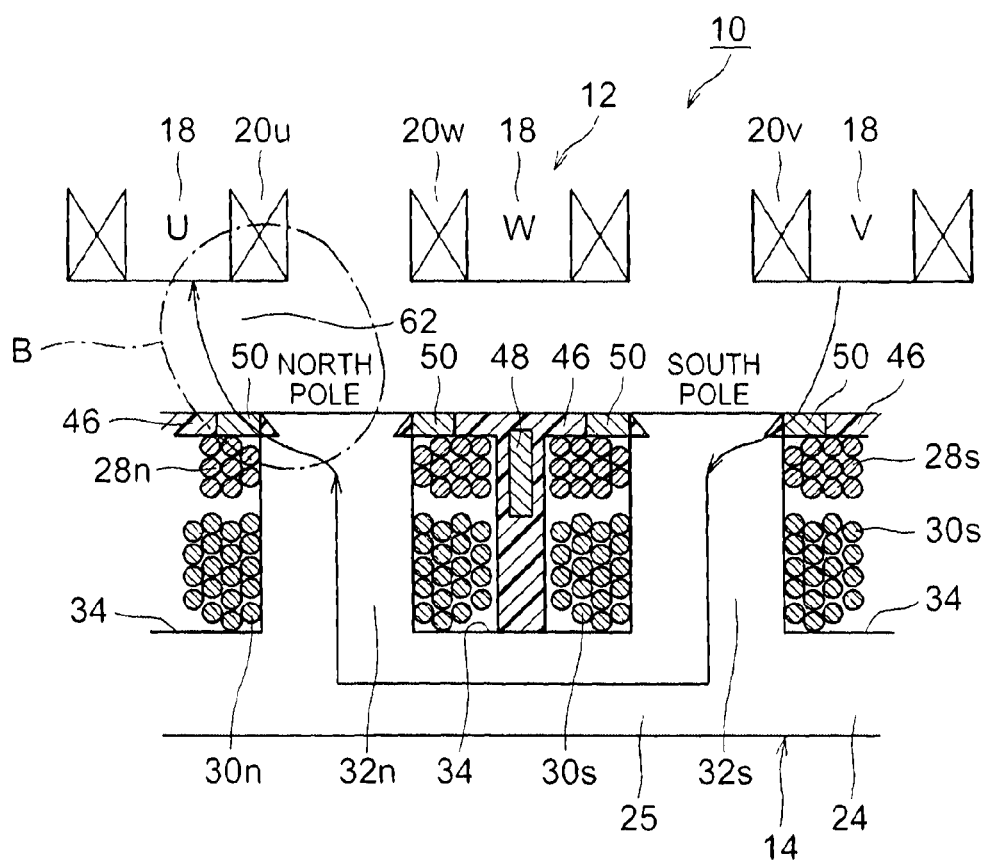
FIG. 6 is a schematic diagram that shows a flow of magnetic flux for a fundamental wave in the rotating electrical device of FIG. 1, which flows from the stator, passes through the rotor, and returns to the stator.

The aforementioned matter will be described with reference to FIG. 6. FIG. 6 is a schematic diagram that shows a flow of magnetic flux for the fundamental wave that flows from the salient pole 18 of the stator 12, passes through the rotor 14, and flows into another salient pole 18 of the stator 12 in the rotating electrical device 10 where the rotor 14 according to the embodiment of the present invention is used. As shown in FIG. 6, a case is considered where the magnetic flux for the fundamental wave flows from one salient pole 18 of the stator 12, passes through the rotor salient pole 32s, the rotor yoke 25, and another rotor salient pole 32n, and flows into another salient pole 18 of the stator 12. In the above case, the rotor 14 rotates in a direction where a magnetic path through which the magnetic flux flows shortens between the salient pole 18 and the rotor salient pole 32n (or 32s). Because the outer magnetic members 50 are provided in the proximity of the circumferential ends of the distal ends of the rotor salient poles 32n and 32s, even when the salient pole 18 and the rotor salient poles 32n and 32s do not face each other in the radial direction such that the phases completely match with each other, the salient pole 18 easily faces in the radial direction any of wide sections that includes the rotor salient poles 32n and 32s and the outer magnetic member 50 that are magnetic material sections on the side of the rotor 14. Therefore, the loss of the rotating electrical device 10 can be reduced in the case where the magnetic saturation does not occur in the rotor salient poles 32n and 32s through enlargement of a width of the magnetic member, which faces the salient pole 18, in the circumferential direction on the side of the rotor 14 and reduction of the magnetic reluctance of a gap 62 between the rotor 14 and the stator 12. In addition, according to the rotor 14 described above, the ease of assembly of the rotor coils 28n, 28s, 30n, and 30s can be improved. This matter will be described next in detail.

As shown in FIG. 2 and FIG. 3, in the rotating electrical device 10 where the rotor coils 28n, 28s, 30n, and 30s are wound on the rotor salient pole 32n (or 32s), it is considered that the rotor coils 28n, 28s, 30n, and 30s are densely wound in advance in the insulator 42 before the insulator 42 is assembled to the rotor salient pole 32n (or 32s) to make the cassette coil, and the cassette coil is fitted to the rotor salient pole 32n (or 32s) together with the rotor coils 28n, 28s, 30n, and 30s. In this case, a proportion of the volume of the rotor coils 28n, 28s, 30n, and 30s with respect to the volume of the slots 34 can be increased. On the other hand, the rotor coils 28n, 28s, 30n, and 30s are fitted from the outside of the rotor in the radial direction to the periphery of the rotor salient pole 32n (or 32s) in previously wound conditions; however, there is a case where a rib of the magnetic member which protrudes in the circumferential direction for preventing fall-off of the rotor coil is integrally formed in the distal end of the rotor salient pole 32n(or 32s). In this case, the rib interferes with the winding arrangement, and the ease of assembly cannot be improved. In other words, in view of improvement of the ease of assembly of the rotor coils 28n, 28s, 30n, and 30s, it is desired that a circumferential width of the radial outer end of the rotor salient pole 32n (or 32s) be not increased greater than the circumferential width of the inner side in the radial direction. When the rib is formed on the rotor salient pole 32n (or 32s), the rib can increase the facing width in the circumferential direction between the rotor salient pole 32n (or 32s) and the salient pole 18, and the loss such as the loss during the low-load conditions can be reduced in a case where the magnetic flux saturation of the rotor salient pole 32n (or 32s) does not occur during the low-load conditions. However, when the rib is not provided, the loss cannot be reduced if a design or an arrangement is not improved.

The aforementioned matter will be described with reference to FIG. 7. FIG. 7 is a diagram corresponding to a section B in FIG. 6 for illustrating an effect of the facing area in relation to the salient pole 18 of the stator 12 and the rotor salient pole 32n on magnetic reluctance of the gap section. The description is made for the rotor salient pole 32n; however, similar description will be made for the rotor salient pole 32s. As shown in FIG. 7, assume that only ends of the salient pole 18 of the stator 12 and the rotor salient pole 32n faces to each other in the radial direction (in a vertical direction of FIG. 7) through the gap 62. In this case, when magnetic permeability under vacuum is $\mu_0$, a gap length is g, and the facing area of the salient pole 18 and the rotor salient pole 32n to each other through the gap 62 is S, the magnetic reluctance Rm in the gap g can be expressed by the following equation.

$$Rm = \mu_0 \times g / S \qquad (1)$$

Most of the loss of the rotating electrical device according to the embodiment of the present invention is copper loss; however, when the magnetic saturation does not occur in the rotor salient pole 32n, the magnetic reluctance of the gap 62 largely influences the loss. Therefore, reducing the magnetic reluctance contributes to the reduction of the loss. As a facing width ds of the salient pole 18 of the stator 12 and the rotor salient pole 32n in the circumferential direction increases, the facing area S increases. Thus, it can be understood from the equation (1) that when the facing width ds is increased, the magnetic reluctance Rm in the gap 62 can be reduced. Accordingly, when the rib is formed in the distal end of the rotor salient pole 32n, the magnetic reluctance Rm can be reduced, and the loss in the case where the magnetic saturation does not occur in the rotor salient pole 32n does not experience can be reduced. However, if the rib exists, the ease of assembly cannot be improved as described above.

In the rotating electrical device 10 that is shown in FIG. 1 through FIG. 6 and includes the rotor 14 according to the embodiment of the present invention, the outer magnetic member 50 that is provided in the circumferential end of the retaining member 46 can be placed in the proximity of the circumferential sides of the rotor salient pole 32n (or 32s). The outer magnetic member 50 similarly functions as the rib of the rotor salient pole 32n (or 32s) in the circumferential direction, and thus the loss in the case where the magnetic flux saturation does not occur in the rotor salient poles 32n and 32s during the low-load conditions can be reduced without the formation of the rib integral with the rotor salient poles 32n and 32s. Accordingly, because the rib does not need to be formed, the outer magnetic member 50 can be provided after the rotor coils 28n, 28s, 30n, and 30s are provided in the periphery of the rotor salient poles 32n and 32s from the outside in the radial direction, and the ease of assembly of the rotor coils 28n, 28s, 30n, and 30s can be improved.

The outer magnetic member 50 is integrally embedded in the circumferential end of the retaining member 46, and thus the outer magnetic member 50 can easily be provided in the proximity of the circumferential sides of the distal ends of the rotor salient poles 32n and 32s. In addition, the rotor coils 28n, 28s, 30n, and 30s can easily be provided in the periphery of the rotor salient poles 32n and 32s from the outside in the radial direction in a state where the retaining member 46 is separated from the rotor core 24. Therefore, the loss of the rotating electrical device 10 can be reduced, and the ease of assembly of the rotor coils 28n, 28s, 30n, and 30s can be improved further.

The rotor salient poles 32n and 32s include the engagement recess 60 that is provided on the side face facing the end of the retaining member 46, the circumferential end of the retaining member 46 is engaged in the engagement recess 60. Therefore, even when the centrifugal force is generated in the rotor coils 28n, 28s, 30n, and 30s during the rotation of the rotor and the force is exerted on the retaining member 46 from the rotor coils 28n, 28s, 30n, and 30s, unintended separation of the circumferential end of the retaining member 46 from the rotor salient poles 32n and 32s can easily be prevented, and the fall-off of the rotor coils 28n, 28s, 30n, and 30s can easily be prevented.

The embodiment of the present invention includes the insulator 42 that is fitted on the periphery of the rotor salient poles 32n and 32s and retains the rotor coils 28n, 28s, 30n, and 30s in the outer side of the insulator 42 under wound conditions, and the insulator 42 can be fitted on the periphery of the rotor salient poles 32n and 32s from the outside in the radial direction in a state where the retaining member 46 is separated from the rotor core 24. Therefore, the ease of assembly of the rotor coils 28n, 28s, 30n, and 30s can be improved further.

Figure 9:
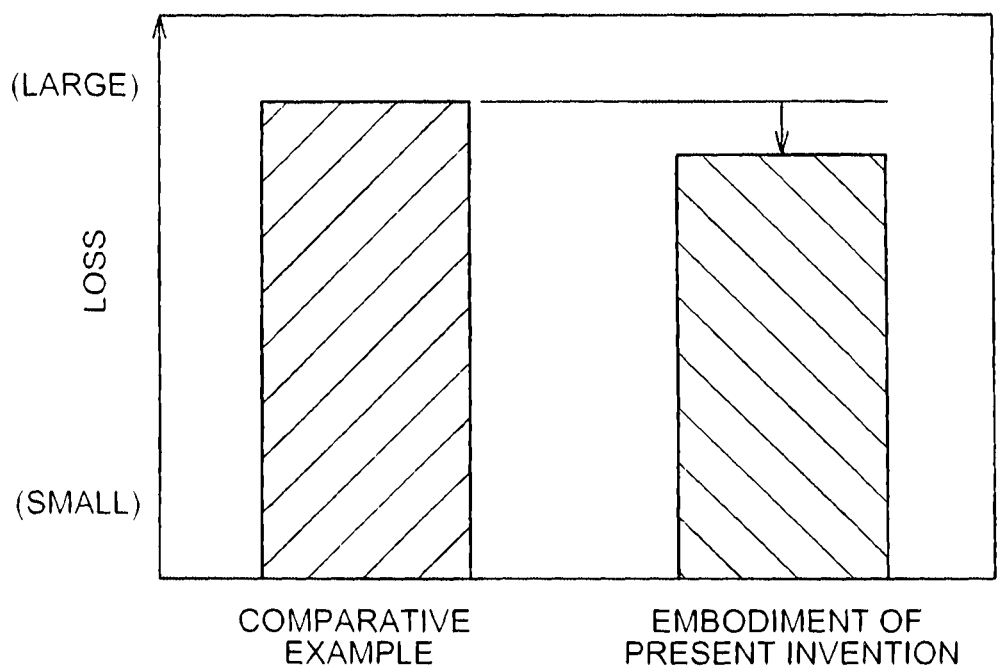
FIG. 9 is a chart that shows loss of the rotating electrical device according to an embodiment of the present invention in comparison with the loss of the rotating electrical device in the comparison example.

FIG. 8 is a diagram corresponding to FIG. 2 and shows a comparative example. FIG. 9 is a chart that shows the loss of the rotating electrical device according to the embodiment of the present invention in comparison with the loss of the rotating electrical device in the comparison example. The above description with reference to FIG. 1 through FIG. 6 has been made of which the outer magnetic member 50 (FIG. 2, FIG. 3) is integrally provided in the circumferential end of the retaining member 46, and therefore the loss in the case where the magnetic flux saturation does not occur in the rotor salient poles 32n and 32s can be reduced. On the other hand, in a case where the outer magnetic member is not provided in the circumferential end of the retaining member 46 as shown in the comparative example of FIG. 8, the magnetic member is not provided outside in the proximity of the circumferential ends of the rotor salient poles 32n and 32s. Therefore, the magnetic reluctance in the gap between the stator and the rotor 14 increases, and this results in the increase of the loss of the rotating electrical device. In other words, as shown in FIG. 9, the embodiment of the present invention can reduce the loss of the rotating electrical device in comparison with the comparative example.

In this embodiment, the retaining member 46 includes the center magnetic member 48 that is provided between the adjacent rotor coils 28n and 28s which are provided between the adjacent rotor salient poles 32n and 32s, and thus the retaining member 46 can effectively lead the magnetic flux by the space harmonic component from the stator 12 to the rotor coils 28n and 28s. Accordingly, the magnetomotive forces for the rotor salient poles 32n and 32s can be increased, and the torque of the rotating electrical device 10 can be increased.

In addition, the center magnetic member 48 is not magnetically coupled to the rotor salient poles 32n and 32s and the rotor yoke 25 that form the rotor core 24. Accordingly, the reduction of torque and power due to a short circuit of magnetic flux within the rotor 14 can be prevented as contrasted with the case where the center magnetic member 48 is magnetically coupled to the salient poles 32n and 32s and the rotor yoke 25. The center magnetic member 48 may be excluded.

Wires formed with fiber-reinforced resin, for example, may be wound on an outer periphery between the salient poles 32n and 32s and the retaining member 46, and thus retainment of the rotor coils 28n, 28s, 30n, and 30s on the rotor core 24 can be reinforced.

Second Embodiment

Figure 10:
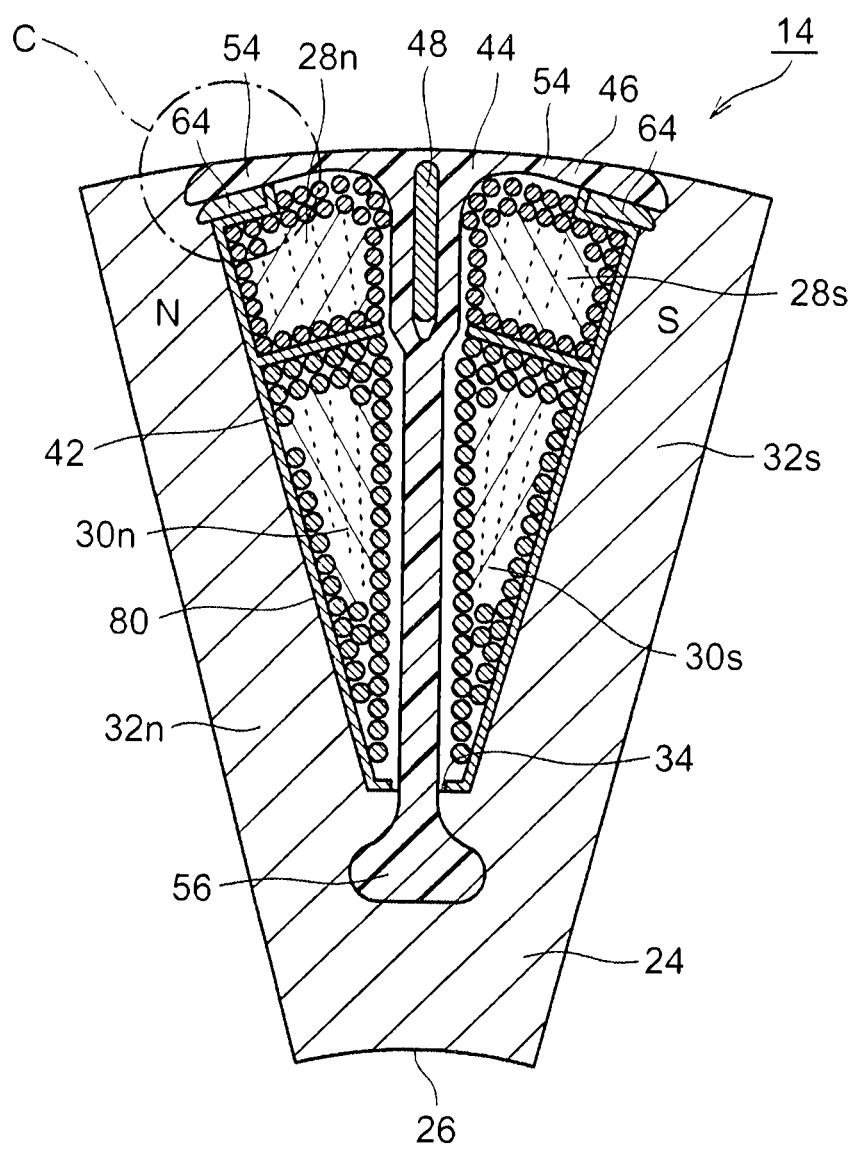
FIG. 10 is a diagram corresponding to FIG. 2 which shows a rotor according to a second embodiment of the present invention.
Figure 11:
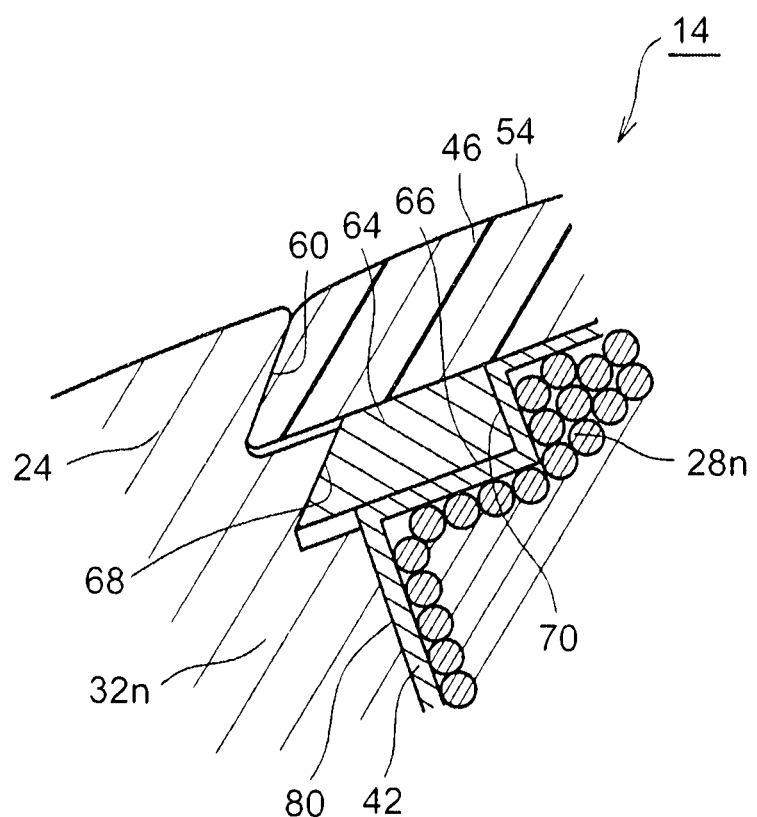
FIG. 11 is an enlarged view of a section C in FIG. 10.

FIG. 10 is a diagram corresponding to FIG. 2 which shows the rotor 14 according to a second embodiment of the present invention. FIG. 11 is an enlarged view of a section C in FIG. 10. As shown in FIG. 10 and FIG. 11, the outer magnetic member is not integrally embedded in the circumferential end of the retaining member 46 in this embodiment. Alternatively, a plate-shaped outer magnetic member 64 is provided in a radial inner side of the circumferential ends of the retaining member 46 and in a radial outer side of the rotor coils 28n and 28s as a different member from the retaining member 46 so as to face the retaining member 46. More specifically, as shown in FIG. 11, the outer magnetic member 64 is secured in the rotor core 24, connected to an outer peripheral surface of a radial outer end of the tubular part 80 of the insulator 42 retaining the rotor coil 28n, and interposed between an outer peripheral end 66 covering the outside of the rotor coil 28n in the radial direction and the beam 54 of the retaining member 46. The side of the rotor coil 28s not shown in FIG. 11 is similarly formed. A second engagement recess 68 is formed in the radial inner side of the engagement recess 60 provided in a side face of the rotor salient pole 32n, and an end of the outer magnetic member 64 is engaged in the second engagement recess 68. The outer magnetic member 64 is interposed in the circumferential direction between a step 70 formed in the outer peripheral end 66 of the insulator 42 and the second engagement recess 68. Therefore, the end of the outer magnetic member 64 comes into contact with an inner surface of the second engagement recess 68.

When the retaining member 46 and the outer magnetic member 64 are assembled to the rotor core 24, the rotor coils 28n and 30n are first assembled so as to be fitted from the outside in the radial direction to the periphery of the rotor salient pole 32n through the insulator 42. Then, the outer magnetic member 64 is inserted between the step 70 formed in the insulator 42 and the second engagement recess 68 the axial direction of the rotor core 24 or is fitted from the radial direction of the rotor core 24. In this state, the retaining member 46 is inserted between the adjacent rotor salient poles 32n and 32s in the axial direction, and the retaining member 46 is assembled to the outside of the outer magnetic member 64. In this condition, the displacement of the outer magnetic member 64 to the outside of the rotor in the radial direction is restricted by the retaining member 46. The outer magnetic member 64 is interposed between the step 70 of the insulator 42 and the second engagement recess 68 in the circumferential direction, and the outer magnetic member 64 comes in direct contact with the rotor salient pole 32n. Therefore, the magnetic reluctance between the rotor 14 and the stator can be reduced further, and the loss of the rotating electrical device can be reduced further. An embedding hole for the outer magnetic member 64 is not required to be formed in the retaining member 46 as contrasted with the case where the outer magnetic member 64 is integrally embedded in the retaining member 46. Accordingly, time and effort for the working of the retaining member 46 can be saved. Other structures and operations are the same as those of the above embodiment described with reference to FIG. 1 through FIG. 7.

Third Embodiment

Figure 12:
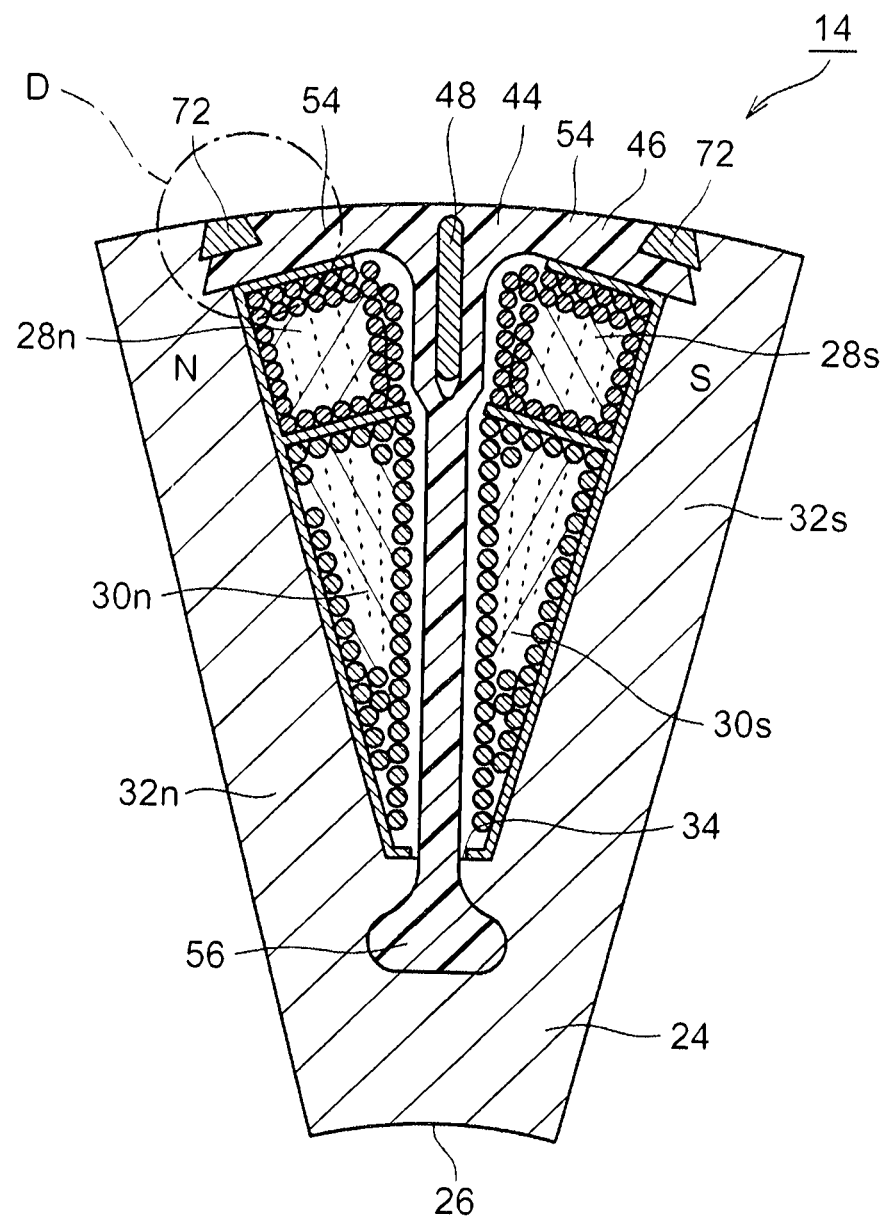
FIG. 12 is a diagram corresponding to FIG. 2 which shows a rotor according to a third embodiment of the present invention.
Figure 13:
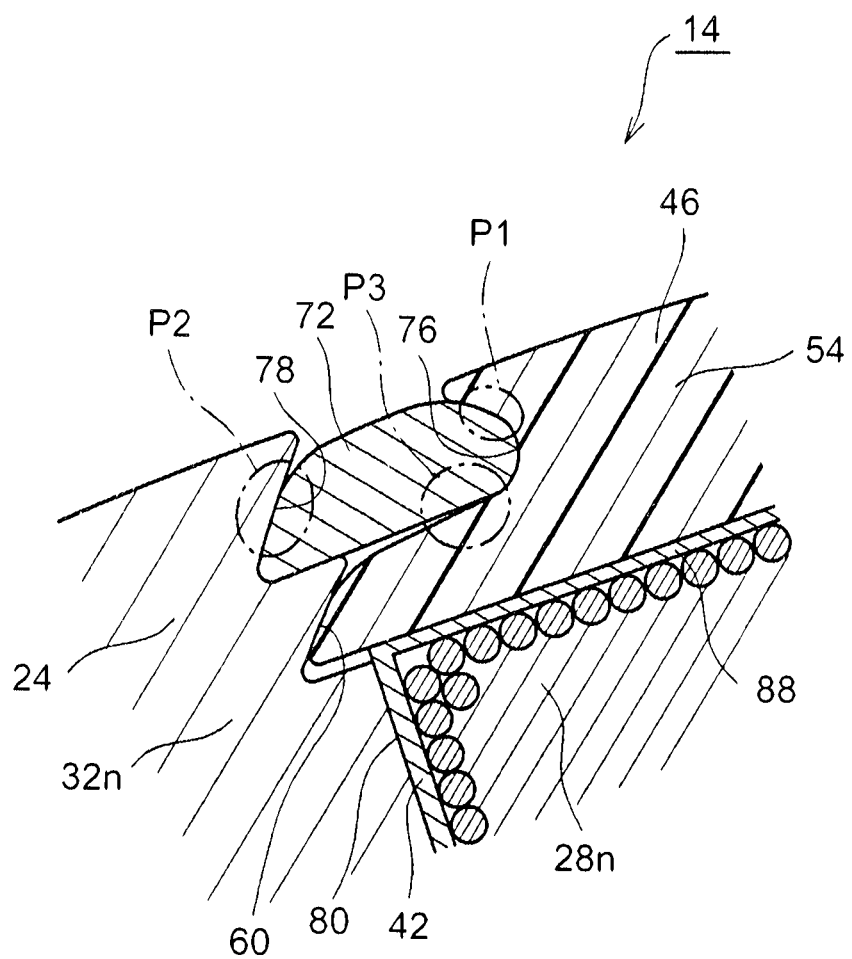
FIG. 13 is an enlarged view of a section D in FIG. 12.

FIG. 12 is a diagram corresponding to FIG. 2 which shows the rotor 14 according to a third embodiment of the present invention. FIG. 13 is an enlarged view of a section D in FIG. 12. As shown in FIG. 12 and FIG. 13, the outer magnetic member is not integrally embedded in the circumferential end of the retaining member 46 in this embodiment as is the case with the second embodiment. Alternatively, a plate-shaped outer magnetic member 72 is provided in a radial outer side of the circumferential ends of the retaining member 46 as a different member from the retaining member 46. More specifically, as shown in FIG. 13, the beam 54 of the retaining member 46 is provided to be connected to an outer peripheral surface of the radial outer end of the tubular part 80 of the insulator 42 retaining the rotor coil 28n and positioned outside an outer rib 88 covering the outside of the rotor coil 28n in the radial direction. The side of the rotor coil 28s not shown in FIG. 13 is similarly formed. An engagement groove 76 is formed in a radial outer surface of the distal end of the beam 54 of the retaining member 46 so as to be recessed in the circumferential direction, and the outer magnetic member 72 is interposed in the circumferential direction between the second engagement recess 78 formed outside in the radial direction from the engagement recess 60 in the side face of the rotor salient pole 32n and the engagement groove 76. In this state, the outer magnetic member 72 is engaged with the second engagement recess 78 and the engagement groove 76. In other words, the circumferential ends of the outer magnetic member 72 come into contact at positions enclosed by alternate long and short dash lines P1 and P2 in FIG. 13 and are engaged with the second engagement recess 78 and the engagement groove 76. Therefore, the outer magnetic member 72 comes into contact with an inner surface of the second engagement recess 78.

When the retaining member 46 and the outer magnetic member 72 are assembled to the rotor core 24, the rotor coils 28n and 30n are first assembled so as to be fitted from the outside in the radial direction to the periphery of the rotor salient pole 32n with the insulator 42. In this condition, the retaining member 46 is inserted in the axial direction between the adjacent rotor salient poles 32n and 32s, and the outer magnetic member 72 is inserted in the axial direction between the second engagement recess 78 that is formed in the retaining member 46 and the engagement groove 76. In this condition, the displacement of the outer magnetic member 72 to the outside of the rotor in the radial direction is restricted by the retaining member 46. Even in the case described above, the outer magnetic member 72 comes in direct contact with the rotor salient poles 32n and 32s, and therefore the magnetic reluctance between the rotor 14 and the stator can be reduced further, and the loss of the rotating electrical device can be reduced further. The outer magnetic member 72 can face the salient pole of the stator while other members do not exist between the outer magnetic member 72 and the salient pole of the stator, and the outer magnetic member 72 can be provided in the same position as or in the proximity of a distal end face that is a gap surface of the rotor salient pole 32n with respect to the radial direction of the rotor. Therefore, the outer side surface of the outer magnetic member 72 is formed as the gap surface facing the gap section, and only the magnetic reluctance for the gap surface becomes a magnetic reluctance factor of the gap section between the stator and the rotor 14. Accordingly, the loss of the rotating electrical device can be reduced. Other structures and operations are the same as those of the above embodiment described with reference to FIG. 1 through FIG. 7. The outer magnetic member 72 and the retaining member 46 may be joined and fixed at a position enclosed by an alternate long and short dash line P3 in FIG. 13.

Figure 14:
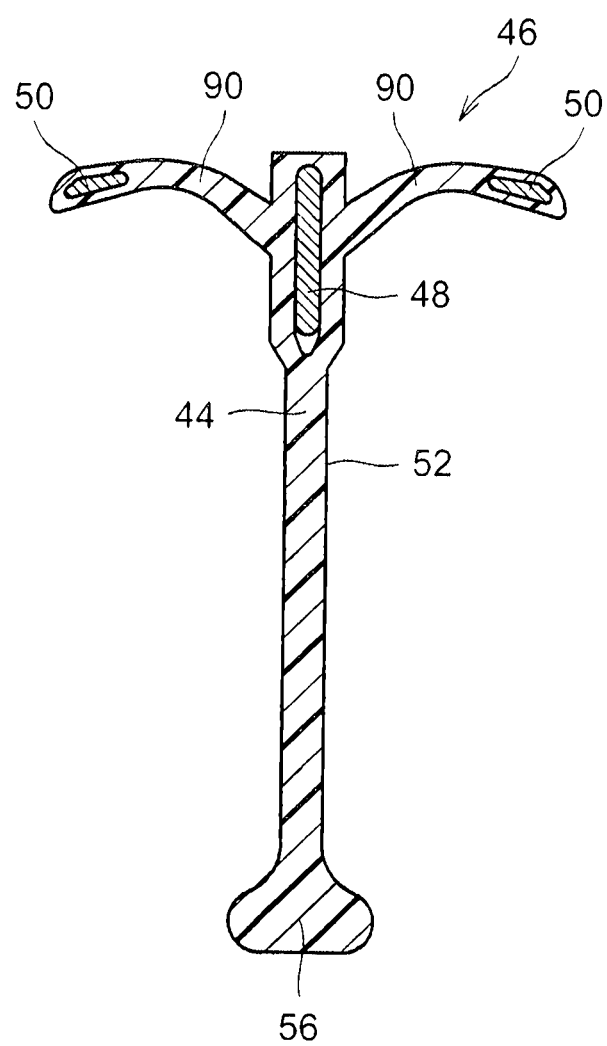
FIG. 14 is a diagram that shows another form of a retaining member according to a modification of the embodiment of the present invention.

The above description has been made in the case where the retaining member 46 has the approximately T-shaped cross-section; however, the shape of the retaining member 46 is not limited to such shapes and can adopt various shapes. For example, FIG. 14 is a diagram that shows another form of the retaining member 46. In an example shown in FIG. 14, a beam 90 that is curved from the radial outer end of the leg 52 of the retaining member 46 to the circumferential sides is protruded. In addition, the radial outer end of the leg 52 which retains the center magnetic member 48 is protruded from a connection with the beam 90 in the radial direction. Even in a case where the retaining member 46 having such shapes is used, the same effects as those of the embodiments described above can be achieved.

While the present invention has been described with reference to embodiments thereof, it is to be understood that the invention is not limited to the embodiments described above and may be modified without departing from the scope of the invention.

What is claimed is:

1. A rotor for a rotating electrical device comprising:
   a rotor core that includes rotor salient poles provided at plural positions in a circumferential direction of the rotor core;
   a rotor coil that is wound on each of the rotor salient poles;
   a retaining member that is made of a non-magnetic material, the retaining member being supported by the rotor core, the retaining member having a beam bridged between the adjacent rotor salient poles and a leg, the leg and the beam being provided as one unit and the leg being fixed in a bottom of a slot in the rotor core, and the retaining member preventing the rotor coil from falling out the slot;
   an outer magnetic member that is provided in proximity of an end of the beam in the circumferential direction; and
   a center magnetic member that is embedded and secured in an outer periphery section of the leg, the center magnetic member being completely surrounded by the leg and not being magnetically connected to the rotor core.

2. The rotor according to claim 1, wherein the outer magnetic member is integrally embedded in the beam.

3. The rotor according to claim 1, wherein the outer magnetic member is provided in an inside or an outside of the beam in a radial direction of the rotor.

4. The rotor according to claim 3, further comprising a fixed member that is fixed in the rotor core,
   wherein the outer magnetic member is provided so as to face an inner surface of the beam in the radial direction of the rotor and the outer magnetic member is interposed between the rotor salient poles and the fixed member in the circumferential direction.

5. The rotor according to claim 3, wherein
   the retaining member has an engagement groove,
   the engagement groove is arranged in an end of the retaining member in the radial direction of the rotor so as to be recessed in the circumferential direction,
   each rotor salient pole has a second engagement recess that is arranged in a side face of the rotor salient pole, and
   the outer magnetic member is engaged with the engagement groove and the second engagement recess in a state of being interposed between the engagement groove and the second engagement recess in the circumferential direction.

6. The rotor according to claim 5, wherein
each rotor salient pole has a first engagement recess that is arranged in the side face of the rotor salient pole, and
the end of the beam is engaged with the first engagement recess.

7. The rotor according to claim 1, wherein
each rotor salient pole has a first engagement recess that is arranged in a side face of the rotor salient pole, and
the end of the beam is engaged with the first engagement recess.

8. The rotor according to claim 1, wherein the retaining member has a T-shaped cross-section.

* * * * *